(12) United States Patent
Takeuchi et al.

(10) Patent No.: US 6,456,577 B1
(45) Date of Patent: Sep. 24, 2002

(54) PREPARING METHOD FOR AUDIO DISC WHEREIN A SPECIFIC TOC IS FIRST WRITTEN IN A LIA

(75) Inventors: Toshio Takeuchi; Mitsugu Hirata, both of Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/577,863

(22) Filed: May 24, 2000

(30) Foreign Application Priority Data

May 25, 1999 (JP) .......................................... 11-145274

(51) Int. Cl.$^7$ ................................................. G11B 3/90
(52) U.S. Cl. ..................................... 369/53.2; 369/30.04
(58) Field of Search ............................. 369/53.2, 53.24, 369/275.3, 30.04, 30.07, 32.01, 33.01, 47.22, 53.41

(56) References Cited

U.S. PATENT DOCUMENTS 5,940,853 A * 8/1999 Ooi et al. ................... 235/454
6,272,081 B1 * 8/2001 Murata ...................... 369/53.2
6,310,854 B1 * 10/2001 Sato et al. ............... 369/275.3

FOREIGN PATENT DOCUMENTS

| EP | 0 540 164 A1 | 5/1993 |
| EP | 0 552 986 A2 | 7/1993 |
| EP | 0 825 591 A2 | 2/1998 |

* cited by examiner

Primary Examiner—Paul W. Huber
(74) Attorney, Agent, or Firm—Frishauf, Holtz, Goodman & Chick, P.C.

(57) ABSTRACT

In a method of preparing an audio disc by writing music in an additionally recordable optical disc, a specific TOC is first written in a lead in area (LIA) of the additionally recordable optical disc. Thereafter, the music to be recorded is written in a program area of the additionally recordable optical disc.

4 Claims, 6 Drawing Sheets

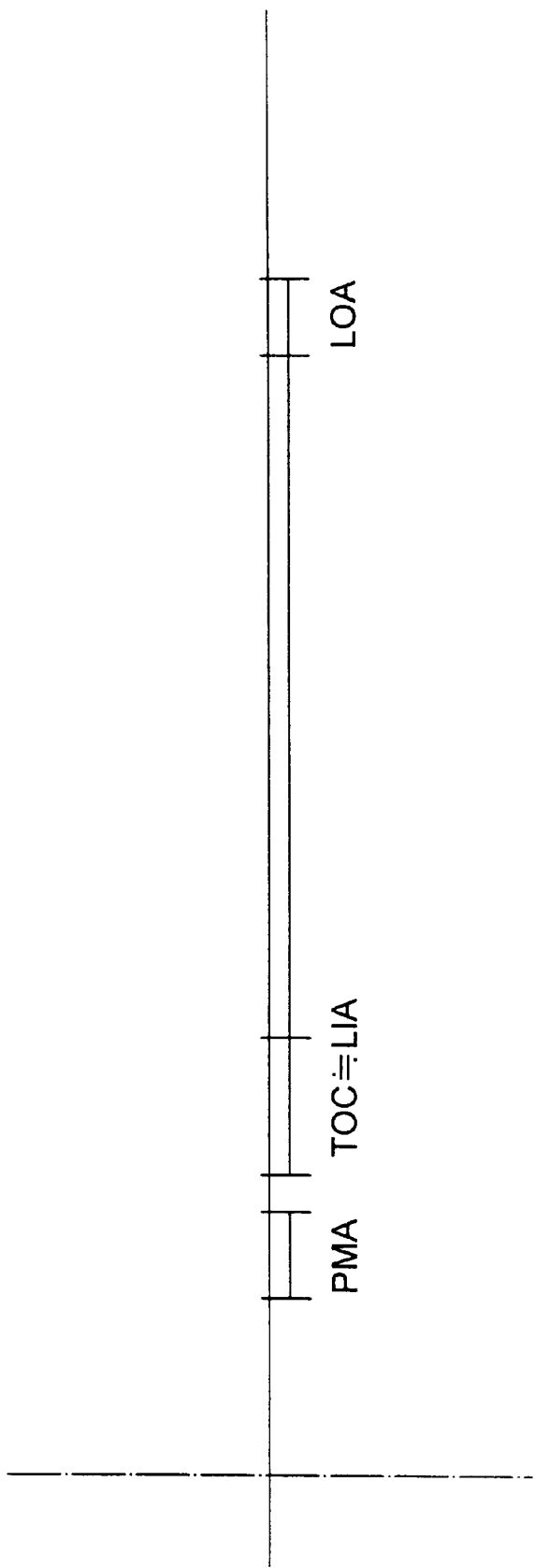

PREPARING METHOD FOR AUDIO DISC WHEREIN A SPECIFIC TOC IS FIRST WRITTEN IN A LIA

BACKGROUND OF THE INVENTION

This invention relates to a method of preparing an audio disc by writing music in a recordable optical disc.

In the manner, which will later be described in conjunction with FIGS. 1A and 1B, a compact disc (CD) has a diameter of 120 mm and a center hole of 15 mm. In addition, a music program may be recorded in the compact disc at a program area between an inner diameter of 50 mm and an outer diameter of 116 mm. Before and after the program area, namely, inside and outside the area in which the music program is recorded, there are zones which are called a lead in area (LIA) and a lead out area (LOA). A CD player can carry out an automatic musical performance by detecting the zones.

On the other hand, a signal is recorded in the compact disc as a spiral track which is called a physical track. An interval between the adjacent physical tracks is equal to 1.6 μm (about 625 per mm). Accordingly, the compact disc has about 20,000 physical tracks and has a total length of about 5 km.

In general, any book has first a table of contents. If there is no table of contents, it is impossible to easily search where and what is written. In a similar manner in the compact disc, a table of contents is recorded in the compact disc at the most inner circumference thereof. This is called TOC for short. Since the CD player reads contents of the TOC from the compact disc, it is possible to quickly search the compact disc for a target position in response to a command for reproducing a particular movement and to shift or move an optical pickup of the CD player to the target position. The contents of the TOC are recorded in the lead in area (LIA).

In the manner known in the art, an electric equipment such as a personal computer is connected to various peripheral units one of which comprises a memory device or a recording medium. In addition, there are various types of memory devices (recording media). In other words, the memory devices (recording media) are classified into removable media and non-removable media. One of the removable media comprises a compact disc-recordable (CD-R) disc. The CD-R disc is an additionally recordable medium which is compatible with a compact disc read only memory (CD-ROM) disc or a compact disc-digital audio (CD-DA) disc. The additionally recordable medium (optical disc) such as the CD-R disc and a compact disc-rewritable (CD-RW) disc is herein called an additionally recordable optical disc. Although to write information (data) in the CD-R disc requires an exclusive apparatus or a CD-R drive and a writing application, to read the information (data) from the CD-R disc may be carried out by using a CD-ROM drive. Although it is impossible to cancel the data one written, it is possible to frequently add data.

Now, in order to write information (data) in the CD-R disc and to read the information (data) from the CD-R disc, a recording/reproducing optical pickup (which is hereunder merely referred to a pickup) requires for irradiating a laser beam on the CD-R disc.

In general, the pickup of the type described comprises a laser optical source for outputting the laser beam and an optical system for guiding the outputted laser beam to a recording medium such as an optical disc. As described above, it is possible for the CD-R disc to carry out not only reading of information but also writing of information. In the pickup for the CD-R disc, it is necessary to change output or power of the laser beam outputted by the laser optical source either on reading of information or on writing of information. This is because writing of information is carried out by forming pits in a recording layer of the optical disc by irradiating of the laser beam. Accordingly, the output of the laser beam on writing of information is larger than that on reading of information and is, for example, ten to twenty times as large as that on reading of information.

Now, there is a case where data (music) is read out of a predetermined music source and the read data (music) is written in an optical disc (an additionally recordable optical disc) such as a CD-R disc. Under the circumstances, a conventional preparing method for an audio disc comprises the steps of writing all pieces of music on a program area of the additionally recordable optical disc and of writing the LOA and the TOC in the manner which will become clear as the description proceeds in conjunction with FIGS. 2 and 3. However, it is impossible for the conventional preparing method for the audio disc to add any piece of music to the additionally recordable optical disc once the TOC is written on the LIA of the additionally recordable optical disc in the manner which will become clear as the description proceeds in conjunction with FIG. 4.

SUMMARY OF THE INVENTION

It is therefore an object of the present invention to provide a preparing method for an audio disc that is capable of adding one or more pieces of music to an additionally recordable optical disc on which TOC is previously written.

Other objects of this invention will become clear as the description proceeds.

The present inventors studied how to add one or more pieces of music to the additionally recordable optical disc on which the TOC is previously written. As a studied result, the present inventors came to a conclusion that such a problem occurs in prior art because a "decided" TOC is written in the LIA after all pieces of music are written in a program area of the additionally recordable optical disc.

Accordingly, the present inventors reached an idea that it may be possible to add one or more pieces of music to the additionally recordable optical disc many times if a "specific" TOC is written in the LIA. In the mean while, the "specific" TOC means that information indicative of contents of music written in the program area is indefinite or undecided but only information for deciding a "frame" defining the program area is decided.

On describing the gist of this invention, it is possible to be understood that a method is for preparing an audio disc by writing music in an additionally recordable optical disc having a lead in area (LIA) and a program area. According to an aspect of this invention, the above-understood method comprises the steps of writing a specific TOC in the LIA and of writing music to be recorded in the program area.

BRIEF DESCRIPTION OF THE DRAWING

FIG. 2 is a view showing each area of an additionally recordable optical disc;

FIG. 6 is a view showing a definition of logical tracks for TOC by the preparing method of this invention.

DESCRIPTION OF THE PREFERRED EMBODIMENT

Figure 1A:
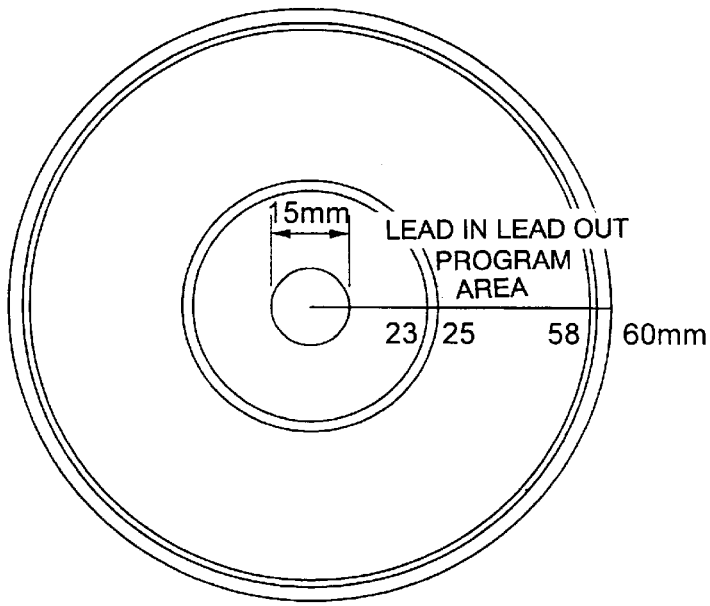
FIGS. 1A and 1B are a plan view and a sectional view showing a compact disc (CD), respectively.
Figure 1B:
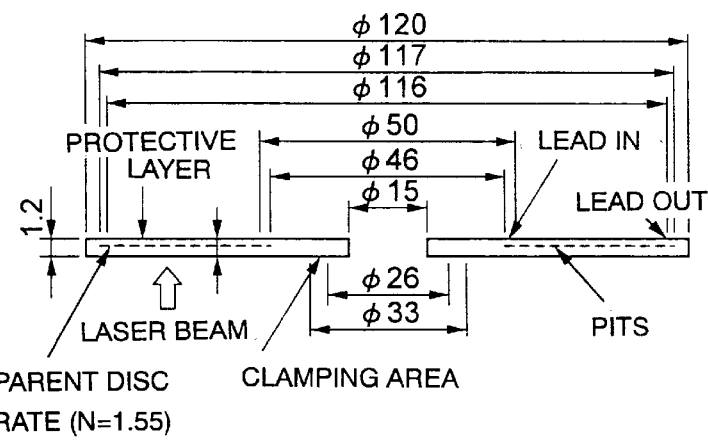

Referring to FIGS. 1A and 1B, a compact disc (CD) will be described at first in order to facilitate an understanding of the present invention.

As shown in FIGS. 1A and 1B, the compact disc (CD) has a diameter of 120 mm and a center hole of 15 mm. The compact disc has a program area between an inner diameter of 50 mm and an outer diameter of 116 mm, a lead in area (LIA) between an inner diameter of 46 mm and an outer diameter of 50 mm, and a lead out area (LOA) between an inner diameter of 116 mm and an outer diameter of 117 mm. That is, the lead in area (LIA) and the lead out area (LOA) are located or lie inside and outside the program area, respectively. A music program may be recorded in the program area. A CD player can carry out an automatic musical performance by detecting the LIA and the LOA.

As shown in FIG. 2, there is an area, which is called a program memory area (PMA), inside the LIA in an additionally recordable optical disc such as a compact disc-recordable (CD-R) disc. In FIG. 2, a dot-dash line denotes a center line of the additionally recordable optical disc.

Now, there is a case where data (music) is read out of a predetermined music source and the read data (music) is written in the additionally recordable optical disc.

Figure 3:
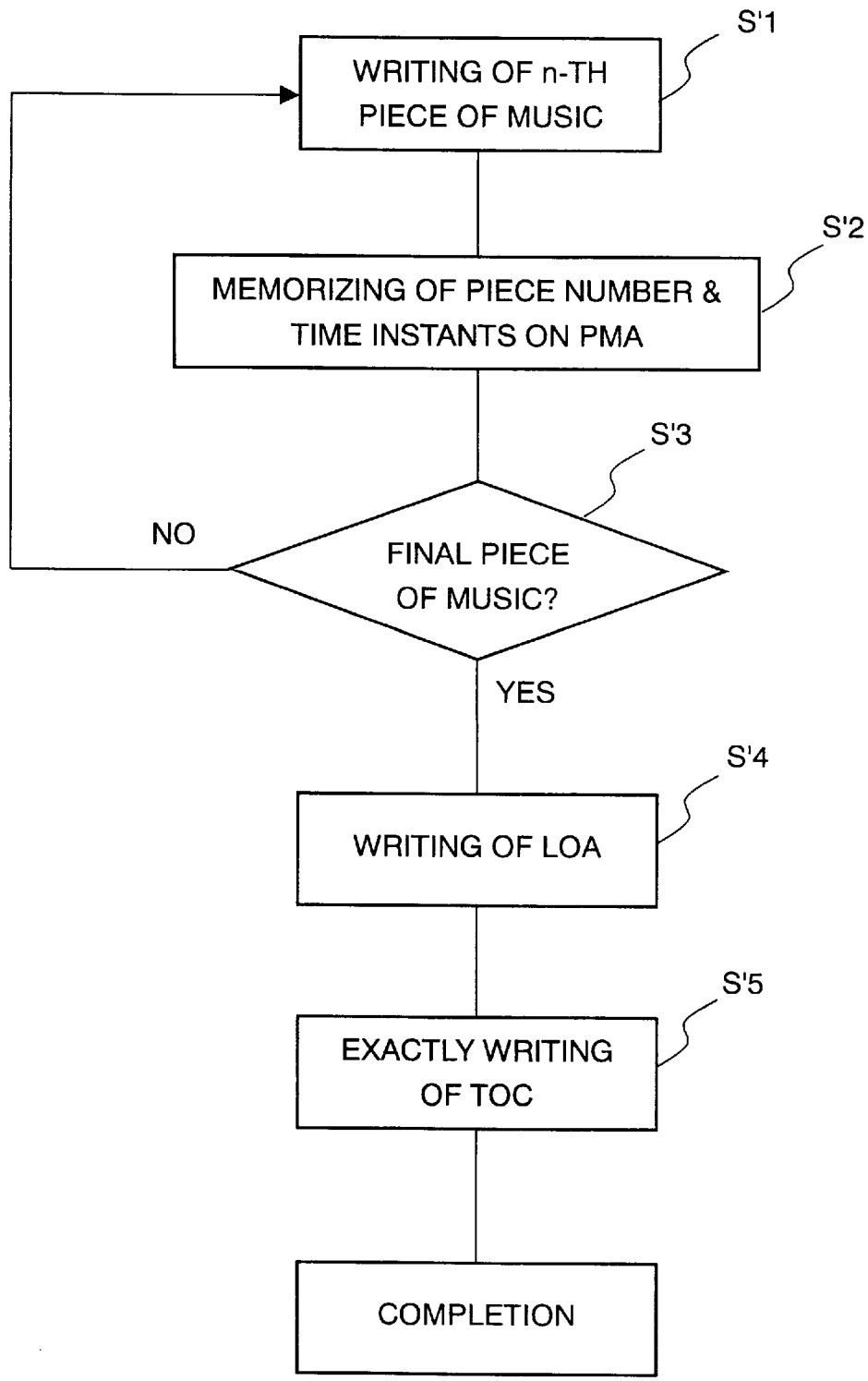
FIG. 3 is a flow chart for use in describing a conventional preparing method for an audio disc.

Referring to FIG. 3, description will proceed to a conventional method of preparing an audio disc by writing music in the additionally recordable optical disc. First, an n-th piece of the music is written on the program area of the additionally recordable optical disc at a first step S'1, where n represents a positive integer. The first step S'1 is followed by a second step S'2 at which a piece number, a start time instant and an end time instant (which are hereunder called time instants) for the n-th piece of the music are memorized on the PMA of the additionally recordable optical disc. The first and the second steps S'1 and S'2 repeat until a final piece of the music (a third step S'3). When the final piece of the music is written on the program area of the additionally recordable optical disc and when a piece number and time instants for the final piece of the music are memorized on the PMA of the additionally recordable optical disc, the third step S'3 proceeds to a fourth step S'4 at which an LOA is written on the additionally recordable optical disc. The fourth step S'4 is succeeded by a fifth step S'5 at which a TOC is exactly written on an LIA of the additionally recordable optical disc.

In the manner which is described above, it is possible to record the music in the additionally recordable optical disc. Although the TOC is written after writing of the LOA in the example being illustrated, one of the TOC and the LOA may be written prior to other. That is, the LOA may be written after writing of the TOC.

At any rate, the conventional preparing method for the audio disc comprises the steps of writing all pieces of the music on the program area of the additionally recordable optical disc and of writing the LOA and the TOC in the additionally recordable optical disc.

As described above, in the conventional preparing method for the audio disc, all pieces of the music are written within the program area of the additionally recordable optical disc and the LOA is written in an outer circumferential area adjacent to an area where the final piece of the music is written. In addition, the piece numbers and the time instants are recorded in the LIA as the TOC. Accordingly, once the TOC is written on the LIA, an audio player or a CD player only can reproduce the pieces of music written in the program area between the LIA and the LOA.

Figure 4:
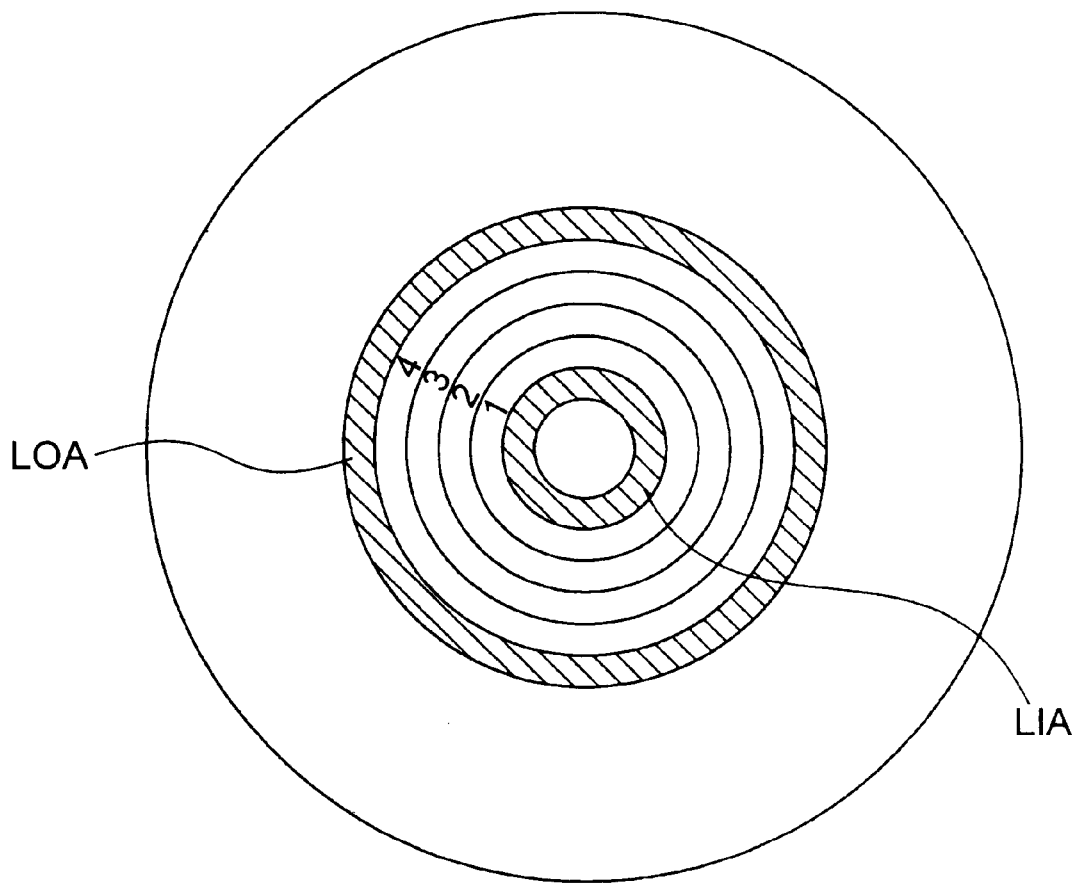
FIG. 4 is a plan view showing an example of the audio disc which is prepared by the conventional preparing method illustrated in FIG. 3.

It will be assumed that all pieces of the music written in the additionally recordable optical disc have a length (time interval) which is shorter than that which is enable to write in the additionally recordable optical disc. Under the circumstances, the LOA may be written in the additionally recordable optical disc at the inside rather than the most outer circumference thereof as illustrated in FIG. 4. Once the TOC and the LOA are written in the additionally recordable optical disc, it is impossible to write any piece of the music on a remaining writable area outside the LOA. This is because it is impossible to move or shift a pickup of the audio player to the remaining writable area outside the LOA inasmuch as information related to all pieces of the music recorded in the program area between the LIA and the LOA are already recorded on the LIA as the TOC.

That is, it is impossible for the conventional preparing method for the audio disc to add any piece of the music to the additionally recordable optical disc once the TOC is written on the LIA of the additionally recordable optical disc, as mentioned in the preamble of the instant specification.

Figure 5:
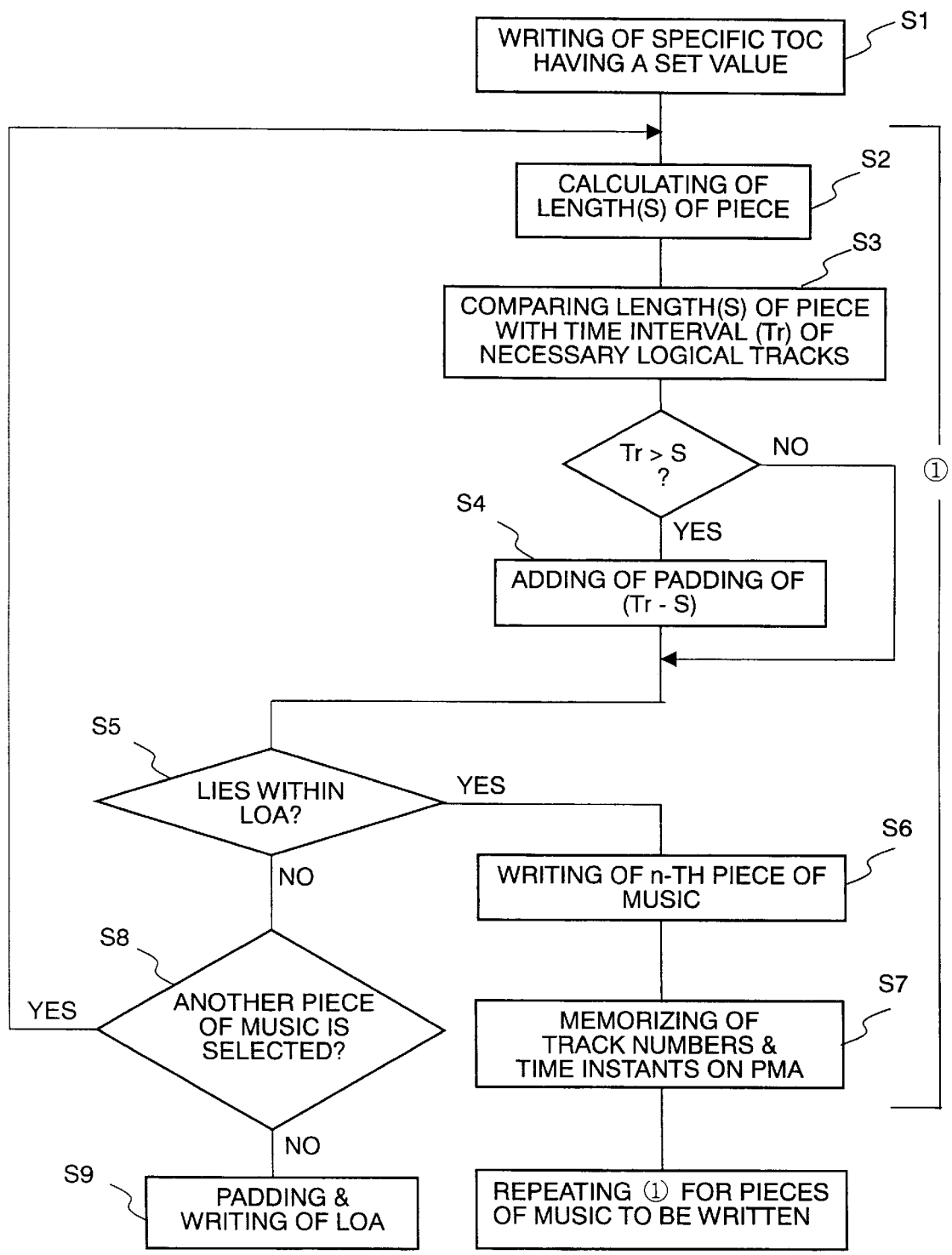
FIG. 5 is a flow chart for use in describing a preparing method for an audio disc according to an embodiment of this invention.

Referring to FIG. 5, description will proceed to a preparing method for an audio disc according to an embodiment of this invention.

In order to realize the preparing method for the audio disc, a recorder or a personal computer require as hardware which comprises devices or apparatus which will presently be described although illustration is omitted. The personal computer may comprise a computer body and peripheral devices. The computer body comprises a central processing unit (CPU) and a memory. The personal computer may comprise, as the peripheral devices, an input unit such as a keyboard or a mouse, a display device such as a cathode ray tube (CRT), a hard disc, and a compact disc read only memory (CD-ROM) drive for reading data. In addition, the personal computer is connected to a compact disc-rewritable (CD-RW) drive for writing data. A compact disc-recordable (CD-R) drive may be used in lieu of the CD-RW drive.

The preparing method for the audio disc according to this invention is a method in which music is read out of a predetermined music source and the read music is written in an additionally recordable optical disc such as the CD-R disc by using the CD-RW drive. The music source may be an audio CD, a raw sound, the Internet, or the like. In addition, the read music may be or may not be temporarily recorded or memorized in the hard disc.

In addition, an application program (FIG. 5) for realizing the preparing method according to this invention and an application program (FIG. 3) for realizing the conventional preparing method are installed in the hard disc. The preparing method according to this invention is realized by selecting the application program (FIG. 5) by means of the mouse.

When the application program for realizing the preparing method according to this invention is activated, a specific TOC having a set value is written on the LIA of the additionally recordable optical disc at a first step Si. Specifically, in conformity to specifications of Red Book, an audio single session and an LOA start time matched with an absolute time in progroove (ATIP) are defined in the TOC. In addition, a disc catalogue number indicative of an effect that this additionally recordable optical disc is an optical disc prepared by the preparing method according to this invention is defined in Mode 2, ADR2 (Q channel of a subcode). Logical tracks matched with a disc capacity are defined in the TOC at intervals of one minute.

Figure 6:
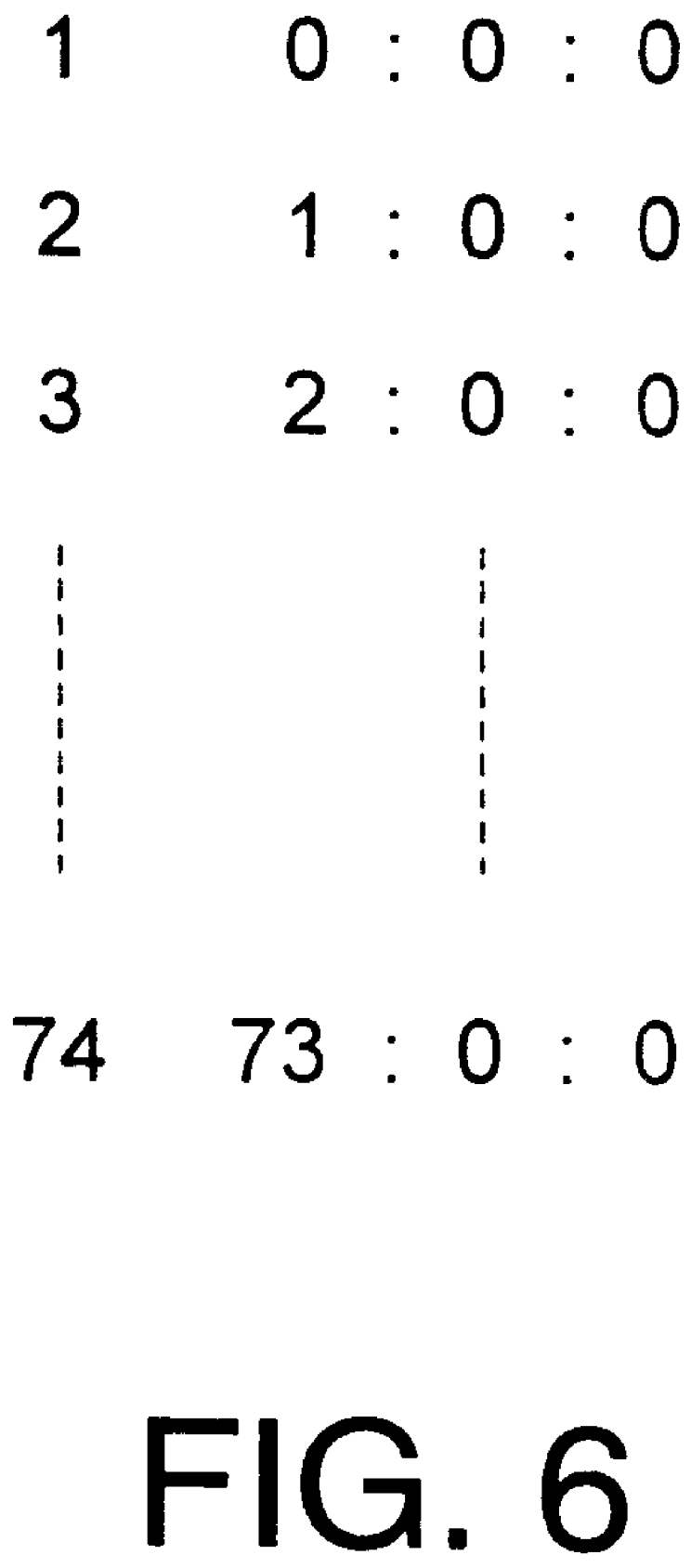

Turning to FIG. 6, it will be assumed that the additionally recordable optical disc has the disc capacity corresponding to seventy-four minutes as shown in FIG. 6. In this event, seventy-four logical tracks are defined in the TOC. In other words, the additionally recordable optical disc has the program area which is divided into the seventy-four logical tracks. In addition, the number of the logical tracks is different each disc capacity. For instance, in a case of the additionally recordable optical disc having the disc capacity corresponding to sixty-three minutes, sixty-three logical tracks are defined in the TOC.

Furthermore, definition for the logical tracks herein is not restricted to the above-mentioned one. For example, the disc capacity may be defined as first through ninety-ninth logical tracks which are equally divided. A user may freely define a length of the logical track and the number of the logical tracks. With this structure, it is considered that the LOA automatically lies in the most outer circumference of the additionally recordable optical disc. Accordingly, the LOA may be written in the most outer circumference of the additionally recordable optical disc or may be written following an end logical track.

In addition, a logical track outside adjacent to the LIA is called a "head logical track" while a logical track inside adjacent to the LOA is called the "end logical track".

As described above, according to this invention, the "specific" TOC is written on the LIA of the additionally recordable optical disc. As a result, it is possible to fully use the program area of the additionally recordable optical disc and to add one or more pieces of music to the program area of the additionally recordable optical disc.

The first step Si is followed by a second step S2 at which a length (time interval) S of a particular piece of the music to be recorded (written) is calculated. The second step S2 proceeds to a third step S3 at which the length S of the particular piece of music is compared with a time interval Tr corresponding to necessary logical tracks. If the time interval Tr is longer than the length S, padding having a difference (Tr–S) between the time interval Tr and the length S is added to the program area of the additionally recordable optical disc at a fourth step S4. The fourth step S4 is succeeded by a fifth step S5 at which it is determined whether or not the length of the particular piece of music lies within the LOA. If determination is positive (YES in the fifth step S5), the fifth step S5 is followed by a sixth step S6 at which an n-th piece of the music is written in the program area of the additionally recordable optical disc, where n represents a positive integer. The sixth step S6 proceeds to a seventh step S7 at which track numbers and time instants (a start time instant and an end time instant) are memorized in the PMA of the additionally recordable optical disc. An operation ① between the second and the seventh steps S2 and S7 is repeated for a portion corresponding to pieces of the music to be written.

On the other hand, if the length of the particular piece of music to be written does not lie within the LOA (NO in the fifth step S5), the fifth step S5 proceeds to an eighth step S8 at which it is determined that another piece of the music is selected. If determination is positive (YES in the eighth step S8), the eighth step S8 is turned back to the second step S2. If determination is negative (NO in the eighth step S8), the eighth step SB is succeeded by a ninth step S9 at which padding is carried out (namely, audio silence of null data is written), the end logical track comes to end in accordance with the abovementioned TOC, and the LOA is subsequently written in the additionally recordable optical disc at the most outer circumference thereof.

As described above, according to this invention, it is possible to add one or more pieces of music to the additionally recordable optical disc until all of tracks indicated by the TOC are written.

While this invention has thus far been described in conjunction with a preferred embodiment thereof, it will now be readily possible for those skilled in the art to put this invention into various other manners.

What is claimed is:

1. A method of preparing an audio disc by writing music in an additionally recordable optical disc having a lead in area (LIA) and a program area, said method comprising the steps of:

writing a specific table of contents (TOC) in the LIA before music is written in the program area, said specific TOC conveying that information indicative of contents of music written in the program area is indefinite or undecided and that only information for deciding a frame defining the program area is decided; and writing the music to be recorded in the program area.

2. A method as claimed in claim 1, wherein further comprises the step of writing a lead out area (LOA) in the additionally recordable optical disc at the most outer circumference thereof after the music to be recorded is written in the program area.

3. A method as claimed in claim 1, wherein the additionally recordable optical disc is a compact disc-recordable (CD-R) disc.

4. A method as claimed in claim 1, wherein the additionally recordable optical disc is a compact disc-rewritable (CD-RW) disc.

* * * * *